(No Model.)

W. TWEEDDALE.
PURIFYING WATER.

No. 295,890. Patented Mar. 25, 1884.

Witnesses
Geo D Hale
Chas. E. Tweeddale

Inventor
William Tweeddale

UNITED STATES PATENT OFFICE.

WILLIAM TWEEDDALE, OF TOPEKA, KANSAS.

PURIFYING WATER.

SPECIFICATION forming part of Letters Patent No. 295,890, dated March 25, 1884.

Application filed July 31, 1883. (No model.)

*To all whom it may concern:*

Be it known that I, WILLIAM TWEEDDALE, a citizen of the United States, residing at the city of Topeka, in the county of Shawnee and State of Kansas, have invented certain new and useful Improvements in Purifying Water for use in Boilers, as well as in the Apparatus Employed in the said Process; and I do hereby declare that the following is a full, clear, and exact description of the invention, which will enable others skilled in the art to which it appertains to make and use the same.

Figure 1:
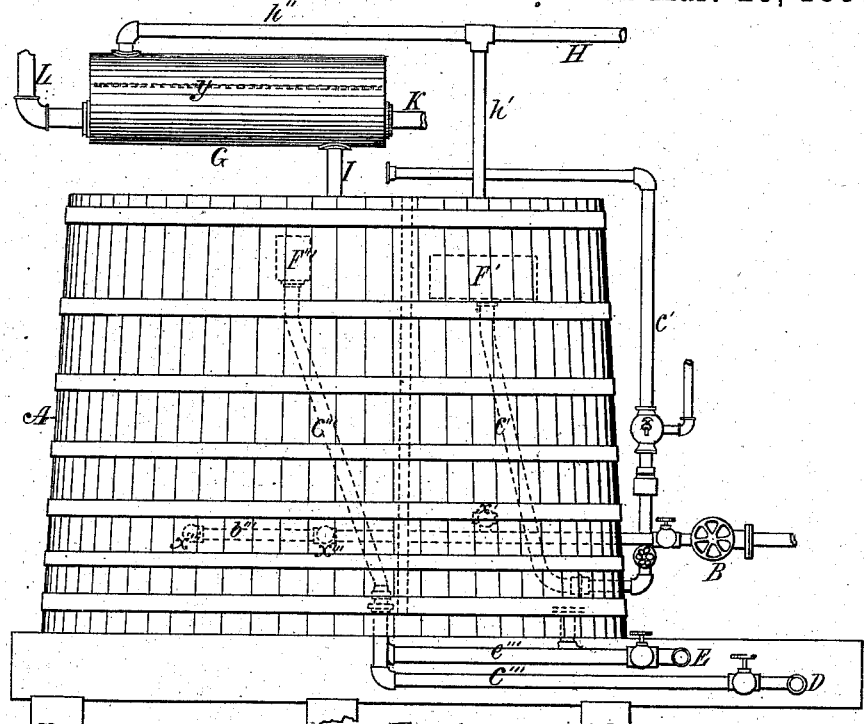
Figure 2:
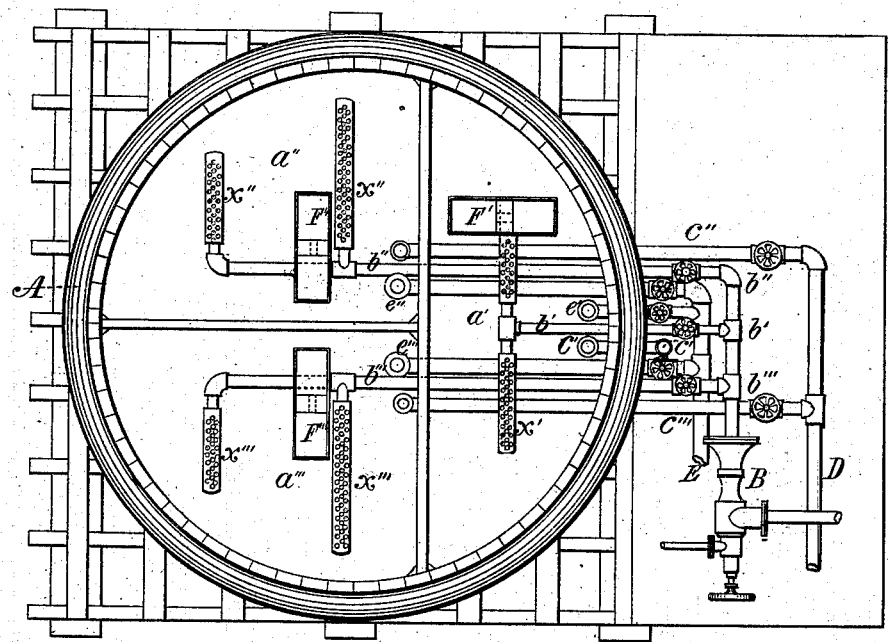

Figure 1 is an elevation, and Fig. 2 a plan, of the apparatus employed in my process.

Similar letters refer to similar parts in the two views.

A is a tank, of any desired proportions and content, divided into three compartments, $a'$ $a''$ $a'''$.

B is an agitator, which consists of a steam and air pipe for introducing steam and air through its branches $b'$ $b''$ $b'''$, provided with stop-cocks, into the several compartments $a'$ $a''$ $a'''$. The steam and air are distributed throughout the compartments by means of the perforated terminal sub-branches $x'$ $x''$ $x'''$, which are closed at their free ends.

$C'$ is a discharge-pipe, provided with a stop-cock, through which the water from $a'$ is pumped into $a''$ or $a'''$ at pleasure.

$C''$ and $C'''$ are discharge-pipes, provided with stop-cocks, through which the purified water is passed by way of the main pipe D from $a''$ and $a'''$ into the boiler for use.

E is a waste-pipe, through which, by means of its branches $e'$ $e''$ $e'''$, provided with stop-cocks, the water with all its precipitates may be withdrawn from the compartments $a'$ $a''$ $a'''$.

$F'$ $F''$ $F'''$ are floating filters, through which the water must pass before entering the discharge-pipe $C'$ $C''$ $C'''$.

G is a heater, divided into two compartments by the perforated diaphragm $y$.

H is a water-pipe, through which, by means of its branches $h'$ $h''$, provided with stop-cocks, the water to be treated is passed into compartment $a'$ or into the heater G.

I is a pipe through which, by means of its branches provided with stop-cocks, water may be passed from the heater into compartments $a''$ or $a'''$ at pleasure.

K is a steam-pipe for carrying steam from the cylinder or boiler into the heater, and L is an exhaust-pipe for passing the steam from the heater into the open air.

When the apparatus is arranged for work as now described, compartment $a'$ is to be filled full or to a given gage with the water to be treated through the branch pipe $h'$. To this is to be added a quantity of the milk of lime somewhat in excess of that required to make a saturated solution of lime-water at the ordinary temperature—say 50°. This milk of lime must now be thoroughly mixed with the water by means of the agitator B, and then allowed about a half or three-quarters of an hour for precipitation. Then, by means of the jet-pump, transfer from the surface of this standard lime-water an approximately sufficient quantity into either one of compartments $a''$ and $a'''$ to treat a given quantity of the water to be purified, as determined by a previous analysis. Then mix this standard lime-water thoroughly with the water of the compartment by means of the branch $b''$ or $b'''$ of the agitator. The water to be treated must always be heated by passing through the steam of the heater G before it is introduced into the compartments $a''$ or $a'''$. After agitation, the condition of the water should be tested with its proper reagent and corrected, as required, and then, when allowed to stand quiet for about an hour for precipitation, it is purified of its carbonates and ready for use; but should sulphates appear in the water after the carbonates are removed, add carbonate of soda in solution, in quantity approximating the proportion required, as determined by previous analysis, to treat the quantity of water in the compartment. Then mix thoroughly with the agitator and test with a proper reagent, and correct as required; and now, after about an hour allowed for precipitation, the water is purified of its sulphates, and is ready for the boiler. The water must always be introduced into compartment $a''$ or $a'''$ at a temperature so high as will leave it for this stage of the process at least at 160°, as this degree of temperature is essential for the success of the process for the removal of the sulphates, while it promptly accelerates the process for the removal of the carbonates, and thus effectually disposes of the necessity for the employment of large tanks.

I claim, and desire to secure by Letters Patent, as my invention—

1. The combination of the tank A and its compartments $a'$ $a''$ $a'''$ with the agitator B, the discharge-pipes $C'$ and D, the waste-pipe E, the floating filters $F'$ $F''$ $F'''$, and heater G, all constructed, arranged, and operated substantially as and for the purpose hereinbefore described.

2. The process of eliminating carbonates and sulphates from water, consisting in introducing into and thoroughly mixing with a quantity of water sufficient milk of lime to make an oversaturated solution of lime-water, which, after precipitation, is inducted into the water to be treated, which, having already been highly heated, is thoroughly agitated and allowed more or less time to settle, when carbonate of soda is added, the water being kept highly heated and the mixture again agitated and allowed to settle, substantially as hereinbefore described.

WM. TWEEDDALE.

Witnesses:
GEO. D. HALE,
CHARLES E. TWEEDDALE.